United States Patent [19]

Simmons

[11] Patent Number: 5,153,978
[45] Date of Patent: Oct. 13, 1992

[54] APPARATUS AND METHOD FOR UPSETTING COMPOSITE FASTENERS

[75] Inventor: Clyde D. Simmons, Riverside, Calif.

[73] Assignee: Textron Inc., Providence, R.I.

[21] Appl. No.: 682,880

[22] Filed: Apr. 8, 1991

Related U.S. Application Data

[63] Continuation of Ser. No. 475,155, Feb. 5, 1990.

[51] Int. Cl.⁵ .................... B21D 39/00; B23F 11/00
[52] U.S. Cl. ..................... 29/509; 29/525.1; 29/525.2; 72/69
[58] Field of Search ............. 411/501, 908; 29/509, 29/525.1, 525.2; 72/69; 156/91, 92, 73.5

[56] References Cited

U.S. PATENT DOCUMENTS

| 2,510,693 | 6/1950 | Green . | |
|---|---|---|---|
| 3,576,067 | 4/1971 | Loyd et al. | 156/73.5 X |
| 4,051,592 | 10/1977 | Briles | 29/509 |
| 4,478,544 | 10/1984 | Strand | 411/501 X |
| 4,687,394 | 8/1987 | Berecz | 411/908 X |
| 4,687,396 | 8/1987 | Berecz | 411/908 X |

FOREIGN PATENT DOCUMENTS

| 39847 | 9/1973 | Australia . | |
|---|---|---|---|
| 0268957 | 6/1988 | European Pat. Off. . | |
| 0279014 | 8/1988 | European Pat. Off. | 72/69 |
| 2248471 | 4/1974 | Fed. Rep. of Germany . | |
| 2641804 | 3/1978 | Fed. Rep. of Germany . | |
| 3109500 | 10/1982 | Fed. Rep. of Germany . | |
| 3543105 | 6/1987 | Fed. Rep. of Germany . | |
| 0880594 | 11/1981 | U.S.S.R. | 72/69 |
| 555151 | 8/1943 | United Kingdom . | |
| 207866 | 1/1982 | United Kingdom . | |
| 2173139 | 10/1986 | United Kingdom . | |
| 2205374 | 12/1988 | United Kingdom . | |

Primary Examiner—Timothy V. Eley
Assistant Examiner—C. Richard Martin
Attorney, Agent, or Firm—Knobbe, Martens, Olson & Bear

[57] ABSTRACT

A rotating anvil having a cavity in the shape of a desired upset head is urged against the tail of a composite fastener protruding through a workpiece and the tail is heated and deformed into an upset head sufficiently larger than the fastener shank to prevent the fastener from being withdrawn from the workpiece.

12 Claims, 4 Drawing Sheets

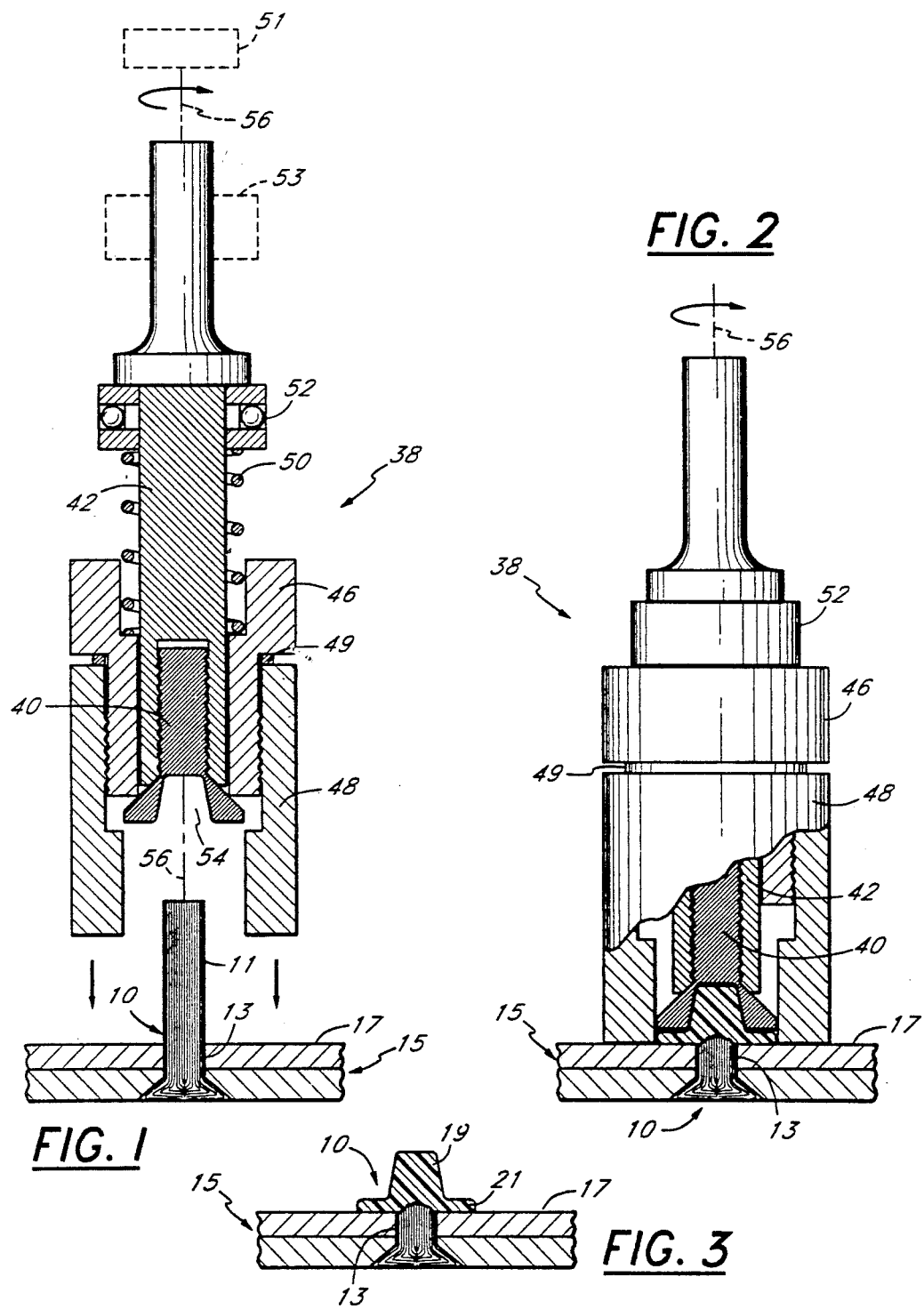

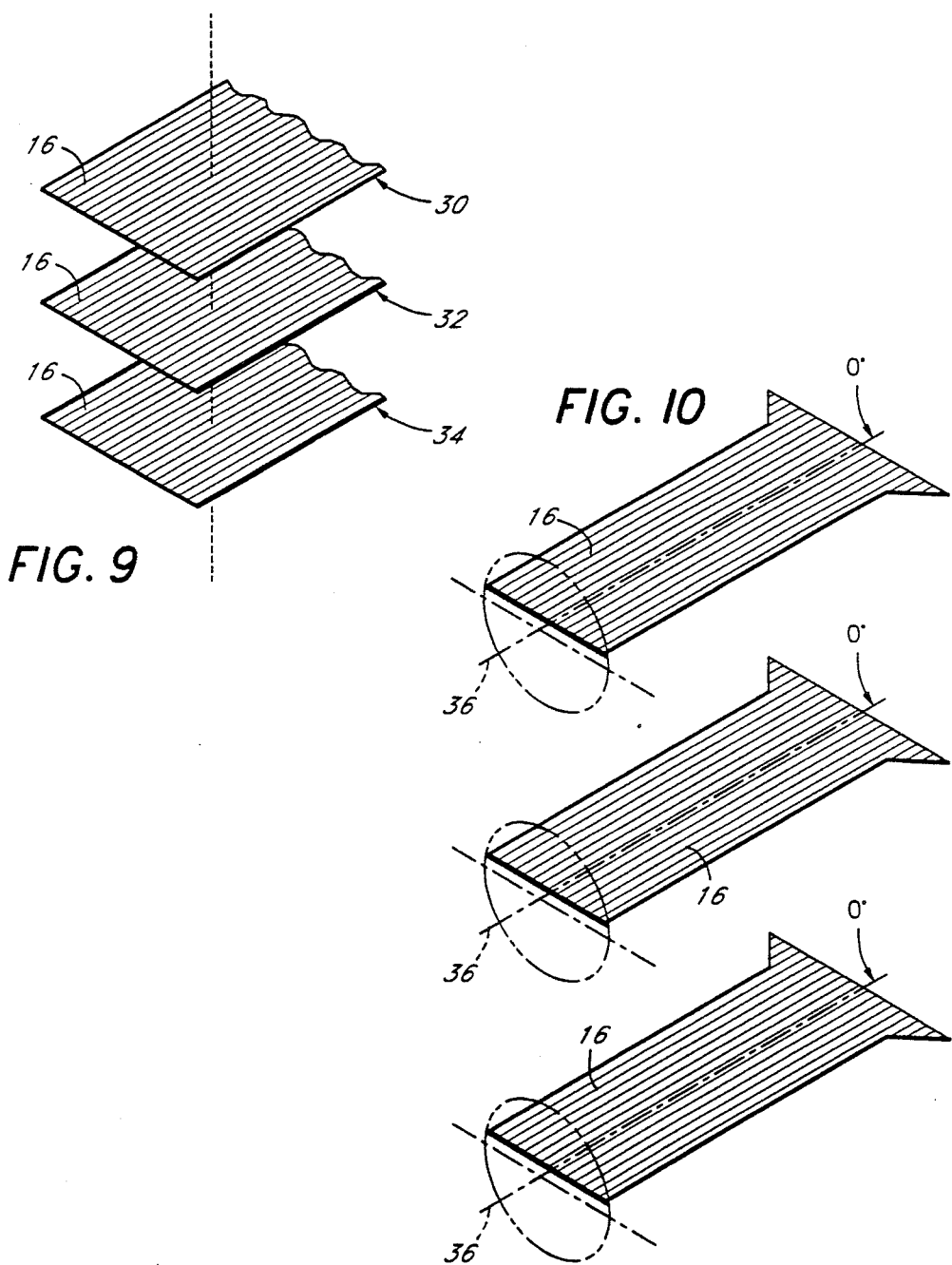

APPARATUS AND METHOD FOR UPSETTING COMPOSITE FASTENERS

This application is a continuation of application Ser. No. 475,155, filed Feb. 5, 1990.

BACKGROUND OF THE INVENTION

The use of composite materials in the construction of military and commercial aerospace vehicles is widespread and increasing. The most commonly used composites consist of a polymer matrix reinforced with fibers of such materials as carbon, glass and Kevlar.

In many cases relatively thin composite panels are used. At the present time, panels 0.088 to 0.189 inches in thickness appear to be most common, although thicker and thinner parts are also used.

To fasten such panels together, adhesive bonding is used wherever possible. When adhesive bonding alone is judged insufficient, fasteners are used in addition to, or in place of, adhesives.

In the manufacture of conventional aluminum aircraft, solid aluminum rivets have been used successfully in very large quantities to fasten the sheet thicknesses mentioned, starting in about 1935 and continuing to the present time. Aluminum rivets are not suitable, however, for use in composite sheet material for several reasons. Some composite materials cause accelerated corrosion of aluminum rivets. The coefficients of expansion of aluminum and the composite materials may be too widely different. A lightning strike problem can arise when aluminum or other metal rivets are used in a composite material. For these reasons a need exists for a rivet which is itself made from composite material.

Considerable work is now being done to enable rivets made from composite material to be used to fasten composite sheets, with or without prior adhesive bonding. Up to the present time, these composite solid rivets have been fabricated using the injection molding process to form a rivet having the required manufactured head shape at one end of the usual cylindrical shank portion. The shank portion is made sufficiently long to pass through the workpieces to be fastened and then protrude approximately two shank diameters beyond. Later, this two diameter protruding length is upset to form a "shop formed" head, which in conjunction with the manufactured head serves to hold the workpieces together.

Examples of suitable materials for making composite solid rivets by injection molding are PEI (polyetherimide) reinforced with short glass fibers and PEEK (polyetheretherketone) reinforced with short carbon fibers. Both these materials belong to a composite materials category which is commonly known as "thermoplastic." Such materials become soft and formable at temperatures in the 600° to 700° range but when cooled to room temperature exhibit useful structural strength.

Rivets made from these short fiber reinforced thermoplastic materials have typical average shear strengths of about 16 KSI when measured using the method of MIL-STD-1312 Test 20 and have typical average tension strength in the range 14 to 16 KSI. These rivets may be upset with any simple tooling which is capable of providing a heat input to the two diameters of protruding rivet tail, followed by a pressure to upset this tail when it becomes soft and formable.

This riveting process seems to be gaining favor for fastening composite materials because the rivets themselves are easily made on readily available, high production injection molding machines and they are inexpensive compared to other suitable fasteners for composites, such as titanium threaded shear pins and collars. Also, experts in the composite aircraft field believe that the drilling of holes in a workpiece and the insertion and upsetting of these rivets can be easily automated. In this way, fastening may be accomplished with a simple inexpensive fastener using an inexpensive and reliable installation method.

In some thick or high bearing strength thin workpieces the 16 KSI shear strength and the 12 to 14 KSI tension strength of common short fiber reinforced thermoplastic materials is not adequate. Thus the need exists for a rivet made from composite material and having higher shear and tension strengths.

Long fiber reinforced threaded shear pin type fasteners having 40 to 60 KSI average ultimate shear strength have been described in U.S. patent application Ser. No. 397,659. High shear strength rivets can also be made from laid up panels as described in that application or from pultruded rod. However, it is difficult to upset rivets made in this way in a workpiece. Accordingly, there exists a need for a simple and practical method of upsetting rivets made from long fiber reinforced material. There also exists a need to provide a shop upset profile which is sufficiently strong in tension to optimize lap joint shear strength.

SUMMARY OF THE INVENTION

The method of this invention involves a shaped upsetting anvil which is rotated at high speed about its axis and then forced into contact with a rivet tail end that preferably extends approximately three shank diameters beyond the workpiece. Friction causes the rivet tail to heat up until it becomes formable at which time the pressure urging the shaped anvil forward is allowed to progressively heat and upset the rivet tail until a shop formed head having the desired shape and dimensions is formed against the workpiece.

While it may be possible to use the method of the invention to upset composite rivets using a hand held tool, it is considered preferable that a machine be used on which the speed of the rotation of the anvil, the pressure applied to urge the anvil towards the workpiece and the speed of this advance are controllable. It is expected that such capabilities as this could most readily be built into such machines as are currently used extensively to install aluminum rivets and other types of aircraft fasteners automatically.

The method of the invention was primarily developed to upset long fiber reinforced rivets made from thermoplastic materials, which are difficult to upset satisfactorily by other methods. However, the method can also be used for upsetting short fiber injection molded thermoplastic rivets.

In forming the upset head, the anvil in the tool may be made in such a shape that the excess of melted material from the protruding rivet shank is spun radially outward in the form of a melted flash. This flash, when formed into a washer of appreciable thickness may serve as a useful provision for limiting the advance of the anvil and avoiding damage to the surface of the workpiece. This washer is also useful as a means of delaying the tilting of the rivet axis which occurs in a thin sheet lap shear joint under load, thereby increasing the shear strength of the rivet and joint combination.

BRIEF DESCRIPTION OF THE DRAWINGS

FIG. 1 is a cross-sectional, elevational view of a fastener extending through workpieces to be fastened together and protruding beyond the back side sheet, and is further a cross-sectional, elevational view of an installation tool.

FIG. 2 is a sectional view of the components of FIG. 1 while the rivet tail is being upset using the method of the invention, with the partially sectioned installing tool in its operational position.

FIG. 3 is a cross-sectional, elevational view of the installed rivet of FIG. 2.

FIGS. 4–10 show stages in the manufacture of a suitable unidirectional reinforced solid rivet having long continuous reinforcing fibers all running in the same direction, parallel to the axis.

DETAILED DESCRIPTION OF THE PREFERRED EMBODIMENT

FIG. 1 shows a solid rivet 10 made from a composite of a polymer matrix reinforced with fibers. FIGS. 4–10 illustrate one method of making such a rivet. The composite material is initially formed in thin sheet-like tapes, called plies, containing fibers which add to the strength of the plies. A suitable tape has a thickness of about 0.005", but other thicknesses can be utilized. Each tape contains a plurality of individual carbon or other reinforcing fibers which are twisted or otherwise held together in a bundle referred to as a tow. A commonly used fiber is about 7 microns in diameter. A commonly used tow contains 12,000 individual fibers. The tows are arranged parallel to each other and are bound together using a binder of polymeric resin. A common binder for binding the carbon fibers and tows together is PEEK, referred to above. As will be appreciated from FIG. 6, the schematically illustrated tows 16, each composed of individual filaments, are generally parallel to each other and greatly increase the shear strength of the tape in the direction perpendicular to the fibers. These tows also greatly increase the tension strength in the direction of the fiber flow axes. Since tows are often referred to as fibers, and a composite material in theory could have individual fibers rather than bundles or tows, the elements 16 will be for convenience referred to fibers, which is the most common term.

Figure 4:
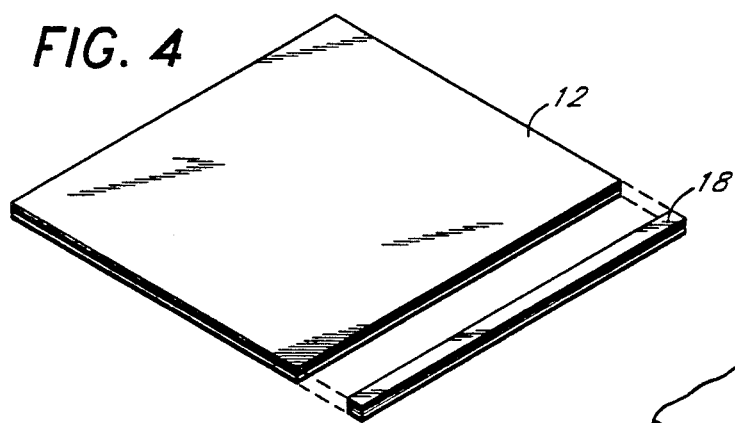
Figure 5:
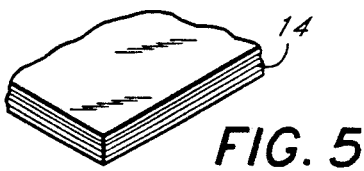

The tapes can be made into a panel 12, illustrated in FIG. 4. To make a panel, a number of plies 14 of tape are stacked one on top of the other, as more clearly seen in FIGS. 5 and 9. The stack is then heated while applying a compressive load. This process causes the binder and adjacent plies 14 of tape to bind the plies together. After the panel 12 is formed, it is cooled. This creates a rigid composite panel having the desirable characteristics discussed above.

Figure 6:
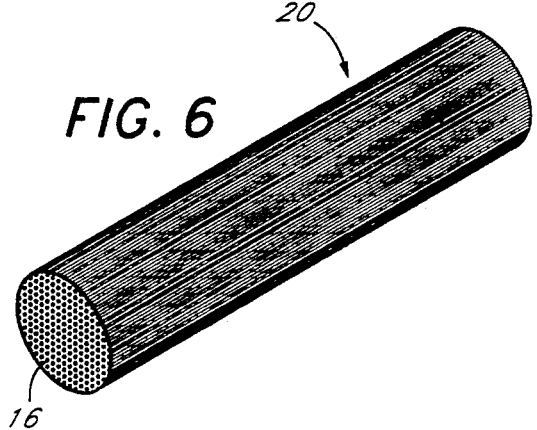

To use the material to make a fastener, a section or bar 18 is cut from the edge of the panel, as indicated in FIG. 4. The bar 18 can then be machined either by turning it on a lathe or either by grinding it between centers and cutting it into shorter pieces to produce a cylindrical rod 20, as shown in FIG. 6.

Figure 7A:
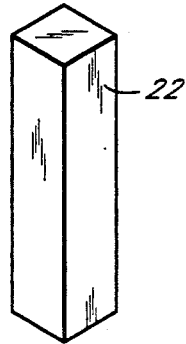
Figure 7B:
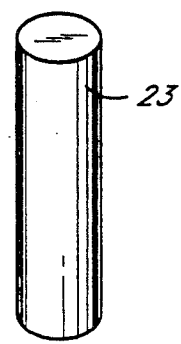
Figure 7C:
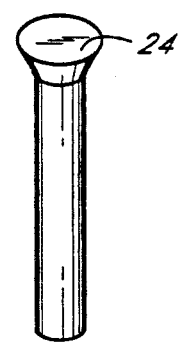

FIGS. 7a–7c show the manufacture of an individual rivet in stages. The square cross-section bar stock 22 is turned on a lathe or ground to produce a cylindrical blank, as shown in FIG. 7b. The blank 23 can then be heated and compressed to form a head 24, shown in FIG. 7c and in FIG. 8.

Figure 8:
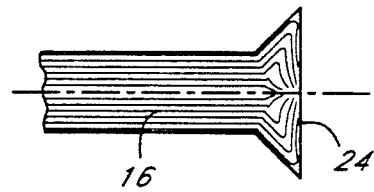
Figure 11:
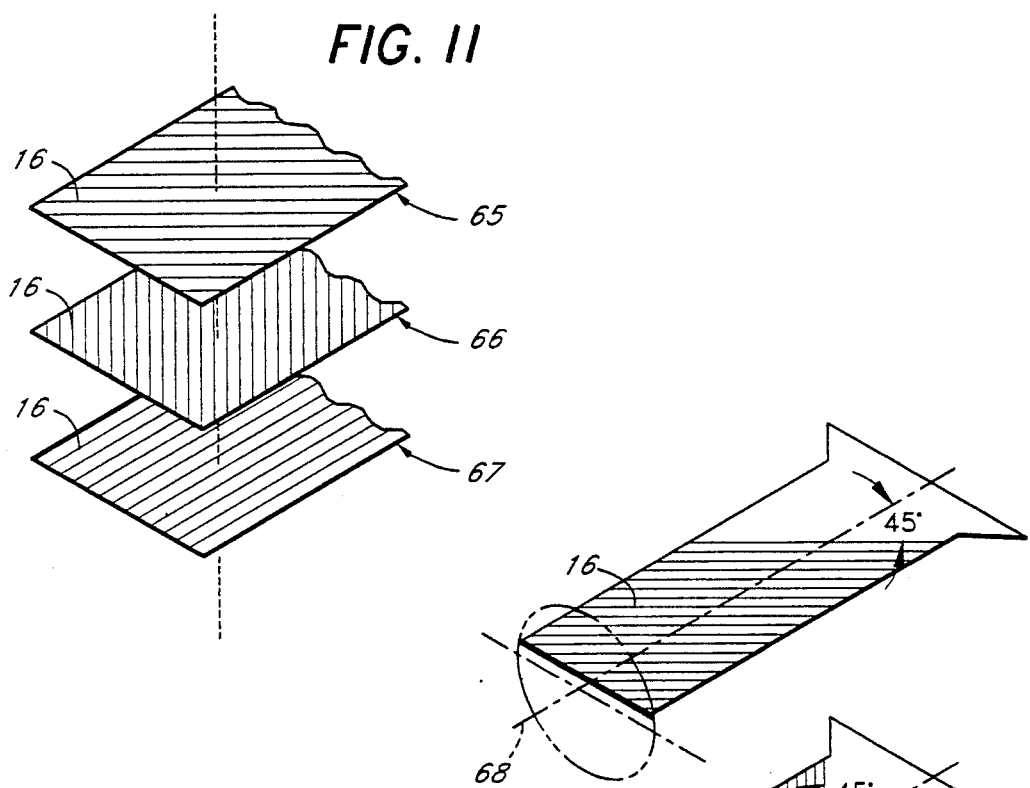
FIGS. 11 and 12 show a composite panel and rivet made from tape containing long, continuous, unidirectional reinforcing fibers, but with some tape plies having their fibers running in orientations other than parallel to the rivet axis.
Figure 12:
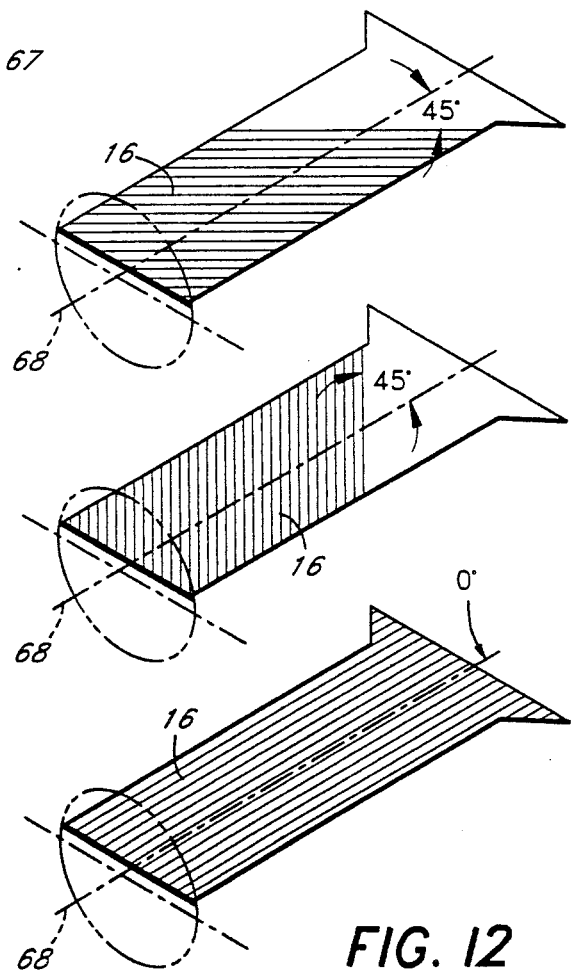

With the fibers 16 in all of the layers or plies of tape in the same direction, the layup produces what is termed a unidirectional, reinforced long fiber rivet, as seen in FIGS. 8 and 10. Other orientations may be useful; for example, a +45/−45/0 layup could be used. The layup angles describe the direction of the fibers 16 in each single tape layer relative to a zero line. This zero line coincides with what later becomes the long axis of the rivet. Referring to FIG. 11, the top layer 65 represents a +45 angle. The second layer 66 represents a −45 angle, which is at 90° with respect to the layer 30, and the lower ply 66 represents a 0° or no angle. FIG. 12 show how these fiber angles relate to the zero line 68 and to a manufactured fastener.

Although the layup and cut method is illustrated for producing blanks for forming the rivet of FIG. 8, it should be realized that suitable blanks may also be made from many thermoplastic materials and continuous fibers by the pultrusion method, which is a well-known process in the plastic industry.

Referring again to FIG. 1, the rivet 10 is shown inserted in the workpiece 15, and is of a length such that its tail 11 protrudes beyond the face 17 of the workpiece, approximately 3 diameters of the workpiece shank 13. Also illustrated in FIGS. 1 and 2 is a suitable tool 38 for producing the desired upset in the rivet.

The tool 38 includes an anvil 40, mounted within the lower end of an elongated spindle 42. The upper end of the spindle engages with a suitable mechanism 53 (schematically shown) for rotating the spindle at considerable speeds. Surrounding the lower end of the spindle is a sleeve 46, connected by threads or other suitable means to a shroud 48, which surrounds the lower end of the sleeve and the spindle with the anvil in it, and extends beyond the lower end of the anvil in one position, as viewed in Figure A spacer 49 extends between the upper end of the shroud and a shoulder of the sleeve. A coil spring 50 surrounds a portion of the spindle and extends between the sleeve and the lower portion of a thrust bearing 52 in which the spindle is mounted. Thus, the spring continuously urges the sleeve and the shroud downwardly in a direction to urge the shroud to extend beyond the anvil. Note from FIG. 1 that the downward movement of the sleeve and shroud is limited by the lower end of the sleeve engaging the upper surface of the flared lower end of the anvil. In addition to the spindle being mounted for rotation, the entire tool is mounted for axial movement by suitable means 51 (schematically shown), and the shroud and spindle can move axially and rotationally relative to each other.

The lower end of the anvil has an internal cavity or recess 54 having a desired internal surface of revolution in the shape of a desired upset head to be formed on the rivet. The cavity has a frusto conical shape with the lower larger diameter end being an open mouth leading to an upper smaller diameter end.

To produce an upset, the axis 56 of the anvil of the tool is first aligned with the axis of the rivet to be upset. The spindle is then rotated at an appreciable speed; for example, 3,000 RPM, and the whole tool is moved at a preset rate of movement towards the rivet and the workpiece.

Referring to FIG. 2, the lower end of the shroud 48 contacts the upper surface 17 of the workpiece 15 and ceases to rotate, while the anvil 40 and the spindle 42 continue to rotate and approach the rivet tail 11. The spring 50 maintains the shroud 48 in contact with the workpiece 15. The thrust bearing 52 permits the spindle 42 to rotate while the shroud 48 remains stationary.

When the rotating anvil 40 contacts the end of the rivet tail 11 it is held in contact using a suitable pressure such that friction between the anvil and the rivet produces heat, without prematurely deforming the cold portion of the shank 13. When the melting temperature of the rivet is reached, (625° F. approximately in the case of PEEK) the melted portion of the rivet end begins to flow. Under the continued influence of pressure and friction the rivet upset continues to form. Melted PEEK matrix materials and reinforcing fibers are forced downwards and outwards until further downward and outward movement of the material is limited by the space available within the shroud. As noted above, the tail end volume is larger than the cavity volume such that melted material is spun radially outward to form a melted flash. This flash becomes a washer that limits the advance of the anvil. The washer also strengthens the finished joint with the workpiece.

Friction heating, melting and flowing continues until the available rivet tail volume has been deformed into a space of equal volume, defined by the anvil profile, the internal walls of the shroud and the top surface 17 of the workpiece 15.

At this point rotation of the tool spindle 42 is halted; but the pressure is maintained on the anvil 40, until the temperature of the deformed material in the upset head 19 falls to appreciably below the melting point of the PEEK material (for example, 400° F. or below) at which time the tool may be removed and a second rivet upset commenced.

The set fastener and finished joint are seen in FIG. 3. As may be seen, the tail upset head 19 has a frusto-conical shape, with the smaller diameter upper end of the head tapering to a large diameter before flaring into an outwardly extending flange or washer 21. The fastener shank 13 in FIGS. 2 and 3 is shown with schematically indicated fiber lines comparable to FIGS. 8, in that it remains essentially unchanged during the tail upsetting. However, the upset head 19 is shown in conventional cross hatching, since the fibers appear distorted and indistinct in an enlarged cross section of a prototype.

The tool illustrated is an experimental prototype. It is expected that it will be further developed. For example, it is desirable that the tool be warm at the start of the operation so that heat transfer to the rivet is speeded up. Thus, a means for preheating the tool other than friction may be provided. Also, it is desirable that immediately after formation of the upset head is complete and rotation is halted, the cooling of the upset head and tool is as rapid as possible. Therefore cooling fins may be added to the shroud 48 and cooling may also be applied to the spindle 42 and the anvil 40.

What is claimed is:

1. A method of deforming the tail of a rivet shank protruding through a workpiece, said shank being formed of composite materials including a plurality of long fibers held together by a thermoplastic binder, said method comprising the steps of:

pressing a rotating anvil against the end of said tail to heat said binder sufficiently to cause the binder to melt or soften and deform together with the adjacent ends of the fibers which are spun outwardly about the axis of rotation into an upset head sufficiently larger in diameter than the shank to prevent the rivet from being withdrawn from the workpiece, said pressing and said heat not causing said anvil to bond to said tail; and withdrawing said anvil from said upset head.

2. The method of claim 1, wherein said rotation is performed at a speed which in combination with said pressing heats said tail by friction sufficiently to soften the composite material and cause said composite material and the fibers therein to deform.

3. The method of claim 1, wherein the length of the portion of said rivet shank initially protruding beyond said workpiece is about three times the diameter of said shank and volumetrically greater than the volume of said anvil.

4. The method of claim 3, wherein the height of the upset head protruding beyond the workpiece is a little less than 1½ times the diameter of the shank.

5. The method of claim 1, wherein after said tail is deformed, the rotation of the anvil is stopped, and pressure is maintained on said anvil until the upset head solidifies.

6. A method of deforming the tail of a rivet shank protruding through a workpiece, said shank being formed of composite materials including a plurality of long fibers held together by a thermoplastic binder, said method comprising the steps of:

pressing a rotating anvil against the end of said tail to heat said binder sufficiently to cause the binder to melt or soften and deform together with the adjacent ends of the fibers into an upset head sufficiently larger in diameter than the shank to prevent the fastener from being withdrawn from the workpiece, said anvil having a cavity formed on its end surface that engages said tail, and said deforming step is continued until the deformed tail material fills said cavity, thereby forming the upset head in the shape of said cavity;

stopping the rotation of the anvil while continuing to press said anvil against the upset head until the upset head solidifies; and withdrawing said anvil from said upset head.

7. A method of deforming the tail of a rivet shank formed of composite materials and protruding through a workpiece, comprising the steps of:

pressing a rotating anvil against the end of said tail to heat and deform said tail into an upset head sufficiently larger in diameter than the shank so as to prevent the fastener from being withdrawn from the workpiece, said anvil having a cavity formed on its end surface that engages said tail, and said deforming step is continued until the deformed tail material fills said cavity, thereby forming the upset head in the shape of said cavity; wherein said anvil has an annular end surface surrounding said cavity and said cavity is sized in relation to the volume of said tail such that during said deforming step, portions of said deformed tail are spun outwardly from said cavity and are flattened and compressed between said annular surface and the adjacent surface of said workpiece; and withdrawing said anvil from said upset head.

8. The method of claim 7, wherein said cavity has a frusto conical shape with a closed end and a larger open end which facilitates entry onto said tail and removal from the deformed tail.

9. The method of claim 8, where the open end of said cavity has a diameter of about 1.3 times the diameter of said shank, and the closed end of said cavity has a diameter about equal to the shank diameter.

10. The method of claim 3, wherein said anvil has an annular end surface surrounding said cavity and said deforming step continues until the deformed tail material fills said cavity and annular end, so that the material in said annular end limits the progress of said rotating anvil.

11. A method of deforming the tail of a rivet shank protruding through a workpiece, said shank being formed of composite materials including a plurality of long fibers held together by a thermoplastic binder, said method comprising the steps of:

positioning a tubular shroud spaced around said tail and pressing the shroud against the workpiece;

axially moving a rotating anvil into said shroud and pressing the rotating anvil against the end of said tail to heat said binder sufficiently to cause the binder to soften or melt together with the adjacent ends of the fibers into an upset head sufficiently larger in diameter than the shank to prevent the fastener from being withdrawn from the workpiece, the interior of the lower end of said shroud limiting the outer dimension of said head, said anvil having a cavity in its end face with an interior surface of revolution configured in the shape of the desired upset head, and rotating being performed about the axis of said surface of revolution.

12. A method of forming a joint using a composite fastener, comprising the steps of:

providing a plurality of workpiece members;

forming a hole through each of said workpiece members;

aligning said holes to form a workpiece bore;

providing a composite fastener having:
      a substantially cylindrical elongated shank of a length approximately equal to three times the diameter of said shank, plus the combined thickness of said workpiece member, said shank including a plurality of elongated fibers extending throughout the length of the shank, said fibers being held together by a thermoplastic binder; and
      a manufactured enlarged head integral with said shank at one end thereof, the second end of said shank forming a fastener tail;

inserting said shank through said workpiece bore;

urging said manufactured head against said workpiece member;

providing an anvil having a cavity on its end surface defined by an interior surface of revolution configured in the shape of the desired upset head;

rotating said anvil about the axis of said surface of revolution;

urging said rotating anvil against said fastener tail, said axis of said surface of revolution being aligned with the longitudinal axis of said fastener tail, with said rotating and said urging heating said tail by friction sufficiently to soften or melt the binder in said tail causing said tail and the adjacent ends of the fibers to deform, thereby upsetting said fastener tail;

continuing said upsetting of said fastener tail until the material thereof fills said cavity, thereby forming an upset head;

stopping the rotation of the anvil while continuing to press said anvil against said upset head; and withdrawing said anvil from said upset head after said anvil has cooled below the melting temperature of said composite fastener.

* * * * *